(12) United States Patent
Fujioka

(10) Patent No.: US 7,196,143 B2
(45) Date of Patent: Mar. 27, 2007

(54) HIGH-SOFTENING-POINT COPOLYMER, PROCESS FOR PRODUCING THE SAME, AND PRODUCT OF HYDROGENATION THEREOF

(75) Inventor: Toyozo Fujioka, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/517,603

(22) PCT Filed: Jun. 26, 2002

(86) PCT No.: PCT/JP02/06393

§ 371 (c)(1),
(2), (4) Date: Aug. 4, 2005

(87) PCT Pub. No.: WO2004/003041

PCT Pub. Date: Jan. 8, 2004

(65) Prior Publication Data

US 2006/0084773 A1    Apr. 20, 2006

(51) Int. Cl.
*C08F 8/04* (2006.01)
*C08F 232/08* (2006.01)

(52) U.S. Cl. .............................. 525/332.9; 525/332.1; 525/338; 525/940; 526/79; 526/87; 526/283; 526/308

(58) Field of Classification Search ................ 526/283, 526/308, 79, 87; 525/332.1, 338, 940, 332.9
See application file for complete search history.

(56) References Cited

U.S. PATENT DOCUMENTS 6,040,388 A * 3/2000 Nishimura et al. ...... 525/332.1
6,739,239 B1 * 5/2004 Burkart et al. ............... 526/283

FOREIGN PATENT DOCUMENTS

| EP | 845484 | 6/1998 |
|---|---|---|
| GB | 1 377 989 | 12/1974 |
| JP | 52-140591 | 11/1977 |
| JP | 62-506 | 1/1987 |
| JP | 2-51502 | 2/1990 |
| JP | 10-176012 | 6/1998 |
| JP | 2004-26969 | 1/2004 |

* cited by examiner

*Primary Examiner*—Fred Teskin
(74) *Attorney, Agent, or Firm*—Oblon, Spivak, McClelland, Maier & Neustadt, P.C.

(57) ABSTRACT

Provided are a high melting point copolymer prepared by heat-polymerizing cyclopentadiene and/or dicyclopentadiene and a vinyl-substituted aromatic compound, wherein a use amount of a solvent in heat polymerization is 0.1 time or more and less than 0.5 time based on the mass of the whole monomers, and the copolymer has a softening point falling in a range of 100 to 135° C., and a hydrogenated copolymer obtained by hydrogenating the above high melting point copolymer. The hydrogenated copolymer of the present invention is suitably used as an adhesion-providing resin having a high softening point for a hot melt adhesive.

5 Claims, No Drawings

HIGH-SOFTENING-POINT COPOLYMER, PROCESS FOR PRODUCING THE SAME, AND PRODUCT OF HYDROGENATION THEREOF

BACKGROUND OF THE INVENTION

The present invention relates to a high melting point copolymer, a production process for the same and a hydrogenated product thereof, more specifically to a high melting point copolymer comprising a heat polymerization product of (di)cyclopentadiene and a vinyl-substituted aromatic compound, a process for efficiently producing the same and a hydrogenated copolymer which comprises a hydrogenated product of the copolymer described above and which is suitably used as an adhesion-providing resin for a hot melt adhesive.

RELATED ART

In recent years, a hot melt adhesive has been expanding in a use thereof in various fields because it is excellent in a high speed coating property, a rapid curing property, a barrier property, an energy saving property and an economical efficiency. It is used in various fields such as, for example, sanitary materials, packaging, book-binding, non-woven materials, wood working, electric materials, can working, building, bag working and binders for a road.

Used as a conventional hot melt adhesive are, for example, compositions prepared by blending adhesion-providing resins and plasticizers with base polymers such as natural rubbers, ethylene-vinyl acetate copolymers, styrene-butadiene-styrene block copolymers and hydrogenated products thereof, styrene-isoprene-styrene block copolymers and hydrogenated products thereof. In general, Used as the adhesion-providing resin described above are petroleum resins, coumarone resins, phenol base resins, terpene base resins, rosin base resins and hydrogenated products thereof.

In such hot melt adhesives, a high melting point resin having a melting point of 125 to 160° C. is used as an adhesion-providing resin in many cases in order to elevate a constant-temperature creep and a holding power. However, it is difficult to synthesize an adhesion-providing resin having such a high melting point by conventional polymerization processes, and operation such as extending very much a polymerization time is required and provides a problem in terms of an economical efficiency.

DISCLOSURE OF THE INVENTION

Under such circumstances, an object of the present invention is to provide well economically a hydrogenated copolymer which is suitably used as an adhesion-providing resin having a high melting point for a hot melt adhesive and a high melting point copolymer which is used as a raw material therefore.

Intensive researches repeated by the present inventors in order to achieve the object described above have resulted in finding that in heat-polymerizing cyclopentadiene and/or dicyclopentadiene and a vinyl-substituted aromatic compound, a solvent is used in a specific proportion to the monomers to thereby obtain a copolymer having a high softening for a short time and that a hydrogenated copolymer which is suitably used as an adhesion-providing resin having a high melting point for a hot melt adhesive is obtained with a good economical efficiency by hydrogenating this copolymer. The present invention has been completed based on such knowledge.

That is, the present invention provides:

(1) a high melting point copolymer prepared by heat-polymerizing cyclopentadiene and/or dicyclopentadiene and a vinyl-substituted aromatic compound, wherein a use amount of a solvent in heat polymerization is 0.1 time or more and less than 0.5 time based on the mass of the whole monomers, and the copolymer has a softening point falling in a range of 100 to 135° C., (2) a production process for a high melting point copolymer having a softening point falling in a range of 100 to 135° C., wherein cyclopentadiene and/or dicyclopentadiene and a vinyl-substituted aromatic compound are heat-polymerized in the presence of a solvent of 10 mass parts or more and less than 50 mass parts per 100 mass parts of the monomers, (3) a hydrogenated copolymer obtained by hydrogenating the high melting point copolymer as described in the above item (1), (4) the hydrogenated copolymer as described in the above item (3), wherein the softening point falls in a range of 125 to 160° C., and (5) the hydrogenated copolymer as described in the above item (4), wherein the softening point falls in a range of 135 to 160° C.

BEST MODE FOR CARRYING OUT THE INVENTION

The high melting point copolymer of the present invention is a copolymer prepared by heat-polymerizing cyclopentadiene and/or dicyclopentadiene and a vinyl-substituted aromatic compound, wherein a use amount of a solvent in heat polymerization is 0.1 time or more and less than 0.5 time based on the mass of the whole monomers, and the copolymer has a softening point falling in a range of 100 to 135° C., preferably 110 to 135° C.

In the copolymer described above, the vinyl-substituted aromatic compound used as one component of the raw material monomers includes, for example, styrene, α-methylstyrene and vinyltoluene, and they may be used alone or in a combination of two of more kinds thereof.

The above copolymer is produced by heat-copolymerizing cyclopentadiene and/or dicyclopentadiene and the vinyl-substituted aromatic compound described above which are the raw material monomers in a suitable solvent. In this case, capable of being preferably used as the solvent are, for example, hydrocarbon compounds such as benzene, toluene, xylene, cyclohexane, dimethylcyclohexane and ethylcyclohexane. They may be used alone or in a combination of two of more kinds thereof.

In the present invention, a use amount of this solvent has to be selected in a range of 10 mass parts or more and less than 50 mass parts per 100 mass parts of the monomers. If a use amount of the solvent deviates from the range described above, the desired copolymer having a high melting point can not be obtained for a short time, so that the object of the present invention can not be achieved. A preferred use amount of the solvent is 20 to 45 mass parts.

Advantageous as the polymerization method is a method in which the solvent described above is heated preferably to 100° C. or higher, more preferably 150° C. or higher to carry out copolymerization while divisionally adding a monomer mixture of cyclopentadiene and/or dicyclopentadiene and the vinyl-substituted aromatic compound to this heated solvent.

A use proportion of cyclopentadiene and/or dicyclopentadiene and the vinyl-substituted aromatic compound shall not specifically be restricted and falls in a range of usually 70:30 to 20:80, preferably 60:40 to 40:60 on a mass basis. The divisionally adding time is usually 0.5 to 5 hours, preferably 1 to 3 hours. The divisional addition is carried out preferably in equal parts.

In this copolymerization reaction, the monomer mixture of cyclopentadiene and/or dicyclopentadiene and the vinyl-substituted aromatic compound is preferably reacted continuously as well after finishing divisionally adding them. In this case, the reaction conditions shall not specifically be restricted. The reaction temperature is usually 200 to 350° C., preferably 220 to 300° C.; the reaction pressure is usually 0 to 2 MPa·G, preferably 0 to 1.5 MPa·G; and the reaction time is usually 1 to 10 hours, preferably 2 to 8 hours.

After finishing the reaction, the reaction solution is subjected to treatment for removing volatile matters, for example, at a temperature of 100 to 300° C. and a pressure of 0.1 to 10 kPa for 1 to 3 hours, whereby the copolymer of the present invention is obtained.

In the copolymer thus obtained, the softening point falls in a range of 100 to 135° C., preferably 110 to 135° C., and the vinyl-substituted aromatic compound unit has usually a content of 30 to 90 mass %, a bromine value of 30 to 90 g/100 g and a number average molecular weight of 500 to 1,100. The average molecular weight described above is a value reduced to polystyrene measured by a gel permeation chromatography (GPC) (hereinafter, the same shall apply).

The softening point described above is a value determined by a ball & ring method according to JAI 7-1991. The same shall apply to a softening point of the copolymer hydrogenated product described later.

In the present invention, the copolymer thus obtained in which a softening point falls in a range of 100 to 135° C. is subjected to hydrogenation treatment, whereby the hydrogenated copolymer of the present invention is produced.

In this hydrogenation reaction, catalysts of nickel, palladium, cobalt, platinum and rhodium bases are used as a catalyst. The copolymer described above is hydrogenated on the conditions of a temperature of 120 to 300° C., preferably 150 to 250° C., a reaction pressure of 1 to 6 MPa·G and a reaction time of 1 to 7 hours, preferably 2 to 5 hours in the presence of the catalyst described above in a suitable solvent, for example, cyclohexane, ethylcyclohexane, dimethylcyclohexane, methylcyclohexane and tetrahydrofuran.

After finishing the reaction, the reaction solution is subjected to treatment for removing volatile matters, for example, at a temperature of 100 to 300° C. and a pressure of 0.1 to 10 kPa for 1 to 3 hours, whereby the copolymer hydrogenated product of the present invention is obtained.

In the hydrogenated copolymer of the present invention thus obtained, the softening point falls in a range of 125 to 160° C., preferably 135 to 160° C., and the vinyl-substituted aromatic compound unit has usually a content of 0 to 35 mass %, a bromine value of 0 to 30 g/100 g and a number average molecular weight of 500 to 1,100.

The hydrogenated copolymer of the present invention described above is suitably used as an adhesion-providing resin having a high softening point for a hot melt adhesive and can provide a hot melt adhesive having a high constant temperature creep and holding power.

When the hydrogenated copolymer of the present invention is used as an adhesion-providing resin for a hot melt adhesive, the above hot melt adhesive is prepared by blending usually a base polymer and a plasticizer with the above hydrogenated copolymer.

The base polymer described above shall not specifically be restricted, and optional products can be selected from those used as a base polymer in a hot melt adhesive and used. The specific examples of this base polymer include natural rubber, ethylene-vinyl acetate copolymers, amorphous poly-α-olefins, styrene-butadiene-styrene block copolymers (SBS), styrene-isoprene-styrene block copolymers (SIS), and styrene-ethylene-butylene-styrene rubber (SEBS) and styrene-ethylene-propylene-styrene rubber (SEPS) which are obtained by hydrogenating them. They may be used alone or in a combination of two or more kinds thereof.

On the other hand, the plasticizer shall not specifically be restricted, and optional products can be selected from those used as a plasticizer in a hot melt adhesive and used. The specific examples of this plasticizer include paraffin base process oils obtained by subjecting heavy oils fraction obtained by distilling crude oil at an atmospheric pressure to distillation at a reduced pressure and further refining it by hydrogenation reforming and dewaxing treatment, naphthene base process oils obtained by subjecting it to extraction with a solvent, hydrogenation and clay treatment after distillation at a reduced pressure, polybutene and liquid poly-α-olefins. They may be used alone or in a combination of two or more kinds thereof.

A content proportion of the respective components in this hot melt adhesive is varied depending on the required physical properties. Usually, the hydrogenated copolymer falls in a range of 30 to 70 mass %; the base polymer falls in a range of 15 to 40 mass %; and the plasticizer falls in a range of 10 to 40 mass %.

Further, an antioxidant, a wax and a filler in addition to the hydrogenated copolymer, the base polymer and the plasticizer each described above can be added, if necessary, to the above hot melt adhesive as long as the required physical properties are not damaged.

A method for preparing the above hot melt adhesive shall not specifically be restricted, and capable of being used is, for example, a method in which the respective components are heated, molten and mixed or kneaded by means of a propeller type stirrer, a double shaft blender and a kneader. A blending order of the respective components shall not specifically be restricted. Further, the heating temperature shall not specifically be restricted as well, and heating, melting and mixing or kneading are carried out usually at a temperature of 120 to 190° C.

Next, the present invention shall be explained in further details with reference to examples, but the present invention shall by no means be restricted by these examples.

EXAMPLE 1

A one liter polymerization reactor equipped with a stirrer which was substituted with nitrogen was charged with 154 g of xylene (48 mass parts per 100 mass parts of the raw material monomers) and heated up to 260° C., and a mixture of 159 g of cyclopentadiene and 159 g of styrene was added thereto in 120 minutes while stirring. Then, the copolymerization reaction was continued for 140 minutes.

After finishing the reaction, the reaction solution was taken out and treated at a temperature of 200° C. and a pressure of 1.3 kPa for 2 hours by means of a rotary evaporator to remove the unreacted monomers and xylene to obtain 289 g of a copolymer of cyclopentadiene and styrene. The physical properties of this copolymer are shown in Table 1.

EXAMPLE 2

A one liter polymerization reactor equipped with a stirrer which was substituted with nitrogen was charged with 120 g of xylene (30 mass parts per 100 mass parts of the raw material monomers) and heated up to 230° C., and a mixture of 200 g of cyclopentadiene and 200 g of styrene was added thereto in 120 minutes while stirring. Thereafter, the temperature was elevated up to 260° C. in 60 minutes, and then the copolymerization reaction was carried out for 160 minutes.

After finishing the reaction, the reaction solution was taken out and treated at a temperature of 200° C. and a pressure of 1.3 kPa for 2 hours by means of a rotary evaporator to remove the unreacted monomers and xylene to obtain 376 g of a copolymer of cyclopentadiene and styrene. The physical properties of this copolymer are shown in Table 1.

EXAMPLE 3

A one liter polymerization reactor equipped with a stirrer which was substituted with nitrogen was charged with 143 g of xylene (45 mass parts per 100 mass parts of the raw material monomers) and heated up to 240° C., and a mixture of 159 g of cyclopentadiene and 159 g of styrene was added thereto in 120 minutes while stirring. Thereafter, the temperature was elevated up to 260° C. in 60 minutes, and then the copolymerization reaction was carried out for 80 minutes.

After finishing the reaction, the reaction solution was taken out and treated at a temperature of 200° C. and a pressure of 1.3 kPa for 2 hours by means of a rotary evaporator to remove the unreacted monomers and xylene to obtain 292 g of a copolymer of cyclopentadiene and styrene. The physical properties of this copolymer are shown in Table 1.

EXAMPLE 4

A one liter polymerization reactor equipped with a stirrer which was substituted with nitrogen was charged with 80 g of xylene (20 mass parts per 100 mass parts of the raw material monomers) and heated up to 240° C., and a mixture of 200 g of cyclopentadiene and 200 g of styrene was added thereto in 120 minutes while stirring. Thereafter, the temperature was elevated up to 260° C. in 60 minutes, and then the copolymerization reaction was carried out for 380 minutes.

After finishing the reaction, the reaction solution was taken out and treated at a temperature of 200° C. and a pressure of 1.3 kPa for 2 hours by means of a rotary evaporator to remove the unreacted monomers and xylene to obtain 374 g of a copolymer of cyclopentadiene and styrene. The physical properties of this copolymer are shown in Table 1.

COMPARATIVE EXAMPLE 1

A one liter polymerization reactor equipped with a stirrer which was substituted with nitrogen was charged with 288 g of xylene (90 mass parts per 100 mass parts of the raw material monomers) and heated up to 240° C., and a mixture of 159 g of cyclopentadiene and 159 g of styrene was added thereto in 120 minutes while stirring. Thereafter, the temperature was elevated up to 260° C. in 60 minutes, and then the copolymerization reaction was carried out for 500 minutes.

After finishing the reaction, the reaction solution was taken out and treated at a temperature of 200° C. and a pressure of 1.3 kPa for 2 hours by means of a rotary evaporator to remove the unreacted monomers and xylene to obtain 295 g of a copolymer of cyclopentadiene and styrene. The physical properties of this copolymer are shown in Table 1.

TABLE 1

|  | Example | | | | Comparative Example |
|---|---|---|---|---|---|
|  | 1 | 2 | 3 | 4 | 1 |
| Solvent amount per 100 mass parts of monomers (mass part) | 48 | 30 | 45 | 20 | 90 |
| Softening point[1] (° C.) | 100 | 112 | 102 | 130 | 95 |
| Styrene unit content[2] (mass %) | 47 | 49 | 54 | 49 | 54 |
| Bromine value (g/100 g) | 55 | 55 | 55 | 56 | 55 |
| Number average molecular weight [Mn][3] | 730 | 940 | 870 | 980 | 720 |
| Molecular weight distribution [Mw/Mn][4] | 2.2 | 2.6 | 2.5 | 2.8 | 2.3 |

[Remarks]
[1] measured by the ball & ring method according to JAI 7-1991
[2] determined by means of an infrared spectrophotometer (absorbance in a wave number of 700 $cm^{-1}$).
[3] measured by VPO (Vapor Pressure Osmometer)
[4] measured by GPC

EXAMPLE 5

A 300 ml reactor equipped with a stirrer which was substituted with nitrogen was charged with 70 g of cyclohexane, 70 g of the copolymer obtained in Example 1 and 1.5 g of a nickel base catalyst to carry out hydrogenation reaction at a hydrogen pressure of 4 MPa and a temperature of 230° C. for 4 hours.

After finishing the reaction, the reaction solution was taken out, and 4,000 PPM of an antioxidant (brand name "Irganox 1010", manufactured by Ciba Specialty Chemicals Co., Ltd.) was added thereto. Then, the solution was treated at a temperature of 200° C. and a pressure of 1.3 kPa for one hour by means of a rotary evaporator to remove cyclohexane, whereby 70 g of a hydrogenated copolymer of cyclopentadiene and styrene was obtained. The physical properties thereof are shown in Table 2.

EXAMPLE 6

A hydrogenated copolymer was obtained in the same manner as in Example 5, except that in Example 5, the copolymer obtained in Example 2 was substituted for the copolymer obtained in Example 1. The physical properties thereof are shown in Table 2.

EXAMPLE 7

A hydrogenated copolymer was obtained in the same manner as in Example 5, except that in Example 5, the copolymer obtained in Example 3 was substituted for the copolymer obtained in Example 1. The physical properties thereof are shown in Table 2.

EXAMPLE 8

A hydrogenated copolymer was obtained in the same manner as in Example 5, except that in Example 5, the copolymer obtained in Example 4 was substituted for the copolymer obtained in Example 1. The physical properties thereof are shown in Table 2.

COMPARATIVE EXAMPLE 2

A hydrogenated copolymer was obtained in the same manner as in Example 5, except that in Example 5, the copolymer obtained in Comparative Example 1 was substituted for the copolymer obtained in Example 1. The physical properties thereof are shown in Table 2.

TABLE 2

|  | Example | | | | Comparative Example |
|---|---|---|---|---|---|
|  | 5 | 6 | 7 | 8 | 2 |
| Softening point[1] (° C.) | 127 | 140 | 140 | 158 | 115 |
| Styrene unit content[2] (mass %) | 17 | 18 | 1 | 20 | 20 |
| Bromine value (g/100 g) | 6 | 4 | 5 | 8 | 8 |
| Number average molecular weight [Mn][3] | 740 | 950 | 860 | 990 | 730 |
| Molecular weight distribution [Mw/Mn][4] | 2.2 | 2.5 | 2.5 | 2.8 | 2.2 |

[Remarks]
[1] measured by the ball & ring method according to JAI 7-1991
[2] determined by means of an infrared spectrophotometer (absorbance in a wave number of 700 cm$^{-1}$).
[3] measured by VPO (Vapor Pressure Osmometer)
[4] measured by GPC

INDUSTRIAL APPLICABILITY

The high melting point copolymer of the present invention is a high melting point copolymer comprising a heat polymerization product of (di)cyclopentadiene and a vinyl-substituted aromatic compound, and a copolymer having a high melting point can be obtained for a short time with a good economical efficiency by controlling a use amount of a solvent in polymerization.

Further, the hydrogenated copolymer of the present invention which is a hydrogenated product of the copolymer described above is suitably used as an adhesion-providing resin having a high softening point for a hot melt adhesive and can provide a hot melt adhesive having a high constant temperature creep and holding power.

What is claimed is:

1. A hydrogenated copolymer that is obtained by hydrogenating a copolymer prepared by heat-polymerizing cyclopentadiene and/or dicyclopentadiene and a vinyl-substituted aromatic compound while divisionally adding a monomer mixture of cyclopentadiene and/or dicyclopentadiene and the vinyl-substituted aromatic compound to a solvent, wherein a use amount of the solvent in heat polymerization is at least 0.2 and less than 0.45 times based on the mass of the whole monomers, and the copolymer after hydrogenating has a softening point falling in a range of 125 to 160° C.

2. A hydrogenated copolymer that is obtained by hydrogenating a copolymer prepared by heat-polymerizing cyclopentadiene and/or dicyclopentadiene and a vinyl-substituted aromatic compound while divisionally adding a monomer mixture of cyclopentadiene and/or dicyclopentadiene and the vinyl-substituted aromatic compound to a solvent, wherein a use amount of the solvent in heat polymerization is at least 0.2 and less than 0.45 times based on the mass of the whole monomers, and the copolymer after hydrogenating has a softening point falling in the range of 135 to 160° C.

3. A production process for a copolymer having a softening point falling in a range of 100 to 135° C., wherein cyclopentadiene and/or dicyclopentadiene and a vinyl-substituted aromatic compound are heat-polymerized while divisionally adding a monomer mixture of cyclopentadiene and/or dicyclopentadiene and the vinyl-substituted aromatic compound to a solvent in the presence of the solvent of at least 20 and less than 45 mass parts per 100 mass parts of the monomers.

4. The production process as described in claim 3, wherein the vinyl-substituted aromatic compound is selected from the group consisting of styrene, α-methylstyrene, vinyltoluene, and mixtures thereof.

5. The production process as described in claim 3, wherein the solvent is selected from the group consisting of benzene, toluene, xylene, cyclohexane, dimethylcyclohexane, and ethylcyclohexane.

* * * * *